Patented Mar. 20, 1934

1,951,511

UNITED STATES PATENT OFFICE 1,951,511

PROCESS OF MAKING SOAP

Martin Hill Ittner, Jersey City, N. J.

No Drawing. Application February 12, 1931,
Serial No. 515,412

14 Claims. (Cl. 87—16)

My invention relates to certain new and useful methods of manufacturing new and useful soaps from crude oxidation products derived from petroleum.

These crude oxidation products may be those which are formed by any of the well known processes for partially oxidizing petroleum but the steps employed in bringing about the oxidation of the petroleum constitute no part of this invention. Under the most favorable conditions the crude oxidation products formed from petroleum are a mixture containing, among others, the following substances:

Phenols, alcohols, ketones, aldehydes, fatty acids of higher molecular weight, fatty acids of low molecular weight, oxy acids, hydroxy acids, lactones, esters, cracked petroleum, unconverted petroleum, tars. The mixture will also contain many unclassified and unknown substances. The crude product of this reaction is of limited usefulness for the purposes of soap manufacture. Many attempts have been made to purify this product or to separate the fatty acids from it in a relatively pure condition. One of the methods attempted for this purification is low pressure, fractional distillation. This method of separation is dependent upon differences in vapor pressure of the various components of the crude mixture. The fractionation is preferably carried on at low pressure in order that destructive temperatures may be avoided. Even at very low pressures the temperature necessary for volatilization is high enough to cause undesirable decomposition. Also, the separation obtained in this manner is very unsatisfactory by reason of the fact that many of the components of the crude mixture have vapor pressures almost identical with the vapor pressures of the fatty acids, the purification of which is desired. The fractions containing the fatty acids suitable for soap-making will contain substantial proportions of hydroxy acids, lactones, other partially oxidized bodies and some unconverted petroleum. This product is entirely too impure for practical use.

Another method proposed for the purification of the crude product of the oxidation step which precedes my process is steam distillation. This method of separation is also dependent upon differences of vapor pressure which permit the volatilization and distillation of substances at temperatures below their actual boiling points. This method of separation is subject to the same limitations as low pressure fractionation, but is even less satisfactory because far wider differences in vapor pressure are necessary in steam distillation to effect a good separation. The product obtained by steam distillation is entirely too impure for practical use.

Steam distillation at diminished pressure has also been resorted to as a means of purification of the fatty acids but has not proved satisfactory.

Saponification of the crude product of the oxidation process has also been resorted to for the purpose of obtaining a pure product. This method is effective in separating from the mixture part of such unsaponifiable and non-water-soluble substances as higher alcohols, higher ketones, higher aldehydes, tars, unconverted petroleum, cracked petroleum. However, the soap formed will contain soaps of fatty acids of higher and lower molecular weight, soaps of oxy acids, soaps of hydroxy acids, lactone products and considerable amounts of all the impurities originally present in the crude product of the oxidation step.

Other methods, such as solvent extraction, have been employed for obtaining pure fatty acids from the crude mixture obtained from the oxidation of petroleum. These methods of purification, although partially effective, are very wasteful as only a very small fraction of the original material is recovered in usable form.

Many efforts have been made to prepare satisfactory soaps from the product obtained through oxidation of petroleum as purified by known methods. However, soaps heretofore made possess a dark color, objectionable odor, and very poor lathering qualities, and such suds as they make will not last. Furthermore, when such soaps are subjected to ordinary soap-making processes they do not salt out readily, even with almost saturated salt solutions. Such soaps even when made from acids with moderately high melting points are so soft when admixed with good laundry soaps in proportion no greater than ten per cent. of the fatty matter present, that they are very objectionable because of the softness imparted.

Soaps made from these acids as heretofore made are unfit for use by themselves and impart their objectionable qualities to very large quantities of ordinary soap when one attempts to dispose of them by admixture and dilution. Hands and fabrics washed with these soaps become impregnated with a lasting disagreeable odor akin to armpit perspiration and other repulsive animal odors which are often so persistent that subsequent prolonged washing with good soap and water may not entirely eliminate them. None of the known methods for purifying fatty acids and soaps has been successful in depriving these acids or these soaps of their objectionable qualities.

I have, in contrast to the great difficulties experienced by others, devised a means of obtaining good soap from the crude acid product obtained by oxidizing petroleum. My process comprises a combination of (1) Saponification.

(2) Chemical conversion other than saponification.

(3) The removal of undesirable material from the soap formed.

These actions may take place successively or in over-lapping sequence. They may also take place simultaneously with respect to different portions of the same mass.

All of the saponifiable matter may be saponified by the addition of dry or dissolved alkali or alkali carbonate or nitrogen bases which form soaps or alkaline earths, alkaline earth carbonates or basic earths which form soaps. These and other like substances I will hereinafter in the claims refer to as "bases" or "basic materials". In cases where dry bases are employed a current of steam furnishes any water that may be necessary to effect saponification.

When saponification is resorted to as a separate operation, suitable basic media may be employed and the saponification performed along known lines. Dilution of the saponified mass may be resorted to for the partial separation of such hydrocarbons and non-acid oxidized bodies as are not completely soluble in the soap solution.

The second action which I have mentioned as taking place consecutively, in overlapping sequence, or simultaneously with the other actions is a chemical change which has, I believe, previous to my invention, never before been described or employed. This action is one in which soaps of oxyacids or hydroxyacids or soaps from lactones and other saponifiable material are converted into soaps containing oxygen only in the carboxyl groups. I have found that under certain controlled conditions of operation hydroxy acid soaps can be made to part with a molecule of water by the splitting off of an alcohol hydroxyl from one carbon atom and a hydrogen atom from an adjoining carbon atom, leaving a double bond and a lower state of saturation. The lactones upon being made into soap take on an atom of alkali and an alcohol hydroxyl and the soaps so formed when subjected to my process part with their hydroxyls, which form molecules of water, each made by combining with a hydrogen atom from an adjoining carbon atom, leaving a double bond between these two adjoining atoms. This is shown by the fact that the soap thus formed upon decomposition with dilute mineral acids, no longer gives lactones but yields a rearranged but isometric material having approximately the same molecular weight as the original lactone which, therefore, suffers no loss of weight in the conversion of the lactone into a usable type of soap.

It is an important part of the discovery of my invention that this oxygen-removing action can be made to take place in the presence of basic materials. I have discovered that it is controlled heating of the reacting mass in an inert atmosphere, such as steam, which causes hydroxy acid soaps to be converted into soaps containing oxygen only in the carboxyl group. I have also discovered that very thorough agitation is desirable to prevent local over-heating.

The process of my invention should not be confused with involved, uneconomical, known processes in which hydroxy acids or lactones are caused to unite with alcoholic substances, forming esters when heated in the presence of a catalytic agent. This reaction takes place only in a very narrow range of conditions and only when certain particular oils are treated. Some lactone-containing materials decompose to a large extent when treated in this manner. This reaction is carried out in the presence of certain special catalysts and not with the use of alkali. My process, on the other hand, is carried out with the use of alkaline or basic media and in my process a range of conditions exists which is sufficiently broad to permit the practical carrying on of the process. The reaction of my process is completed quite rapidly, practically all of the material being converted. The other process which I have referred to reaches a state of equilibrium with a portion of the material unconverted.

My process is differentiated from every other process for heating soap heretofore resorted to inasmuch as my process gives a perfectly controlled conversion of oxy acids and lactone soap into an improved grade of soap without a breaking down of the molecule. Whereas all processes heretofore employing the heating of soap have had other objects in view and have failed to provide an accurate control of conditions; have failed to exclude air with its destructive influence at high temperatures; have failed to provide effective agitation necessary to prevent local overheating and attendant decomposition; and have in every case either sought a breaking down of the molecule to give a hydrocarbon or ketone, or a polymerization of the product, or as in the well-known Varentrapp reaction, the splitting off of a portion of the molecule with the formation of an acid with a lower molecular weight and very considerable loss of material.

My process, in addition to converting undesirable acids into soap of desirable unsaturated acids, consists in its preferred form in saponifying all acids, oxy acids, lactones and other saponifiable material with a slight excess of alkali. I can employ either caustic soda or sodic carbonate in operating on acids made from petroleum. I can use potash and other alkalies but resort to soda for economical reasons. I may also employ nitrogen bases which form soaps or alkaline earth carbonates or basic earths which form soaps. I heat the soap above its melting point with the exclusion of air while maintaining rapid agitation to prevent local over-heating. The admission of air or use of inadequate agitation will result in objectionable breaking down of the soap at high temperatures.

I can accomplish the desired end by several methods of operation. I have at times taken the mixture containing acid material and hydrocarbons and partly oxidized bodies, lactones and esters, heated them and treated them with a slight excess of caustic soda while thoroughly agitating the mass, excluding air and continuing to heat until substantially dehydrated. In this way the temperature can be raised to over 350 degrees C. while retaining the melt in a thin, liquid condition. I prefer to blow a strong current of steam through the melt which can be used as a means of agitation and a thorough blanket for exclusion of air. I have used successfully for this same purpose, toluol, xylol and carbon dioxide, but have gotten quite objectionable results with much decomposition where any appreciable amount of air was admitted to the melt. A very minute amount of air may not entirely prevent the successful working of the process, but I prefer to exclude all air, as nearly as possible, as I have found that air has a deleterious effect. I have also used diminished pressures, preferably while agitating the melt by blowing a strong current of steam through it. This treatment results in distilling out the non-acid, organic materials and is indeed resorted to in connection with the process as a means of freeing the soap from objectionable unsaponifiable matter. In some cases I have also employed adequate mechanical agitation sufficient to cause rapid and thorough mixing and as a means to eliminate sharp temperature gradients anywhere within or upon the boundaries of the mass, as can also be done by steam agitation.

Although the soap mass heated in the presence of hydrocarbons or unsaponifiable matter has a tendency to remain liquid in heating up to 300 degrees C., soaps freed from such hydrocarbons and unsaponifiable matter may become solid on cooling to 290 degrees C., or lower, causing trouble. To avoid such trouble and to operate successfully the melt may be brought to 300 degrees C. with the use of soap containing some hydrocarbons and unsaponifiable matter and then while being maintained at some desired temperature, preferably between 300 degrees C. and 350 degrees C., may be subjected to alternate additions of untreated soap and withdrawals of treated soap, such additions and withdrawals being so regulated as not to interfere with the desired temperature range and fluidity of the mass. The temperature range over which the mass is fluid can be somewhat widened by the addition of animal or vegetable fats or oils, or their soaps. Throughout the entire operation a strong current of steam for agitation and air exclusion is used and each time before a finished portion of the melt is removed any unsaponifiable matter present can be removed by the steam distillation, this material passing over very rapidly at the temperature of the melt with the strong current of steam, especially when partial vacuum is used. For this reason I prefer to carry on the operation in a still-like apparatus.

In operating by my process, destructive decomposition is completely avoided and lactones and oxy acids are converted to good soap in a very short time at 300 degrees C.,—not longer than necessary to distil out unsaponifiable matter. On the other hand, with the thorough agitation and air exclusion that I employ, the melt appears to be perfectly stable even when heated to 350 degrees C. and maintained there for four hours or more, as has been repeatedly demonstrated. At times I may prefer to exceed 350 degrees C. The conversion of soaps made from oxyacids and lactones is very slow and somewhat incomplete at temperatures substantially below 300 degrees C.

My process is not accompanied by the evolution of any appreciable amount of fixed gas from the decomposition of organic material present. The decomposition that constitutes the Varentrapp reaction and/or modifications thereof, demands a very large excess of caustic potash or caustic potash with caustic soda, and generates a very considerable amount of hydrogen gas, split off from the organic material present, and there is formed a large amount of potassic and/or sodic acetate and the reaction mass yields, after treatment with mineral acid, a very appreciably smaller amount of fatty acids than started with. On the other hand, careful quantative tests on soaps made by my process which, for analytical purposes, have been decomposed by dilute mineral acids, have shown a recovery of from 98 to 100 per cent. of the acid material started with.

Ordinary stearic acid shows an acid value approximating 20.4 per cent. KOH and a saponification value of about 20.8 per cent. KOH. This shows the absence of any great amount of lactones. On the other hand, specimens of "acids" prepared from petroleum hydrocarbons according to methods in use showed on direct neutralization an acid value equivalent to 16.1 per cent. KOH, and on complete saponification, a saponification value of 21.6 per cent. KOH. Evidence that the difference between the acid value and saponification value thus obtained is not due to true esters but primarily to lactones, is to be found in the fact that the "acids" set free by mineral acids after ordinary saponification have the same acid value as before saponification. These same petroleum acids, after subjection to my treatment and decomposition of the soap thus formed with dilute mineral acids, yielded acid with acid values of 21.2 per cent. KOH and 21.7 per cent. KOH, respectively, in two treatments, and saponification values 21.7 per cent KOH in each case, thus showing that objectionable lactones had been almost if not completely eliminated by conversion into good soaps. The iodine absorption of some acids before and after treatment by my process and decomposition of the soaps thus formed by dilute mineral acids were 11.8 per cent. and 36.9 per cent., respectively, thus showing an increase in the degree of unsaturation in the soap molecules due to the treatment.

Acids obtained by the decomposition of the products of this invention by dilute mineral acid, when subjected to vacuum distillation with steam give a good distillate without objectionable decomposition, as experienced before my treatment, and with a yield of distillate of good acids substantially equivalent to the yield of distillate before my treatment. The distilled acids following my treatment and decomposition with dilute mineral acid and distillation gave white soap, almost odorless, with free lathering properties making lasting suds. The soap salts out readily with salt solution or caustic soda and gives a firm soap with desirable properties.

The hydrocarbons and the partially oxidized bodies separated in connection with the process and the unsaponifiable matter recovered during my treatment may all be used, after further oxidizing treatment in making additional acids, which, subjected to my treatment, give usable soap.

While I have fully disclosed one practical method of carrying on the process of my invention and have mentioned specific conditions and tests useful in controlling processes of my invention to give desired results, I do not wish to be narrowly bound by the matter herein disclosed, but what I wish to claim as my invention and to protect by Letters' Patent is the complete meaning of my invention as limited by the scope of the appended claims.

In carrying out my process I employ temperatures considerably above the boiling point of water and at these temperatures liquid water volatilizes rapidly, leaving the heated soap in a substantially anhydrous state, if not absolutely anhydrous. When I employ the term anhydrous soap hereinafter in the claims it is to be interpreted as substantially anhydrous.

When I employ the term "fatty acids" hereinafter in the claims it is to be interpreted as including true fatty acids, which are saturated, mono carboxylic, non-cyclic organic acids, as well as similar acids with varying degrees of unsaturation.

When I employ the term "soap" hereafter in the claims it is to be interpreted not only as including alkaline salts of saturated fatty acids, but also salts of alkalies or other bases with saturated or unsaturated mono carboxylic non-cyclic acids, as well as salts of hydroxyl mono carboxylic non-cyclic acids whether saturated or unsaturated.

What I claim as my invention is:

1. The process of purifying soap made from oxygen-containing organic bodies derived from the oxidation of petroleum and characterized by a content of free or combined monocarboxylic groups which consists in blowing a current of steam into the soap while contained in a closed vessel at a temperature in excess of 250 degrees C., removing the vapors from the vessel, rapidly enough to permit the soap to remain anhydrous even though in the presence of steam, and condensing and recovering said vapors, thereby effecting a removal of alcoholic hydroxyl from said oxygen-containing organic bodies and effecting a separation of unsaponifiable, volatile impurities without deleteriously affecting the soap, substantially as described.

2. The process of purifying soap made from oxygen-containing organic bodies derived from the oxidation of petroleum and characterized by a content of free or combined monocarboxylic groups which consists in blowing a current of steam into the soap while contained in a closed vessel at a temperature in excess of 250 degrees C., removing the vapors from the vessel with the aid of diminished pressure, and condensing and recovering the same, thereby effecting a removal of alcoholic hydroxyl from said oxygen-containing organic bodies and effecting a separation of unsaponifiable, volatile impurities without deleteriously affecting the soap, substantially as described.

3. The process of purifying soap made from oxygen-containing organic bodies derived from the oxidation of petroleum and characterized by a content of free or combined monocarboxylic groups which consists in heating and agitating the soap in a closed vessel in the absence of air at a temperature in excess of 250 degrees C., subjecting the same to a current of steam and withdrawing the volatile vapors, thereby effecting a removal of alcoholic hydroxyl from said oxygen-containing organic bodies and effecting a separation of unsaponifiable, volatile impurities without deleteriously affecting the soap, substantially as described.

4. The process of purifying soap made from oxygen-containing organic bodies derived from the oxidation of petroleum and characterized by a content of free or combined monocarboxylic groups which consists in heating and agitating the soap in a closed vessel in the absence of air at a temperature in excess of 250 degrees C., subjecting the same to a current of steam and withdrawing the volatile vapors with the air at diminished pressure, thereby effecting a removal of alcoholic hydroxyl from said oxygen-containing organic bodies and effecting a separation of unsaponifiable, volatile impurities without deleteriously affecting the soap substantially as described.

5. The process of converting lactones derived from the oxidation of petroleum into soaps of hydroxy acids and removing hydroxyl from such soaps by placing the lactones together with alkaline material in a closed vessel provided with an inlet and an outlet, saponifying the contents of said vessel, heating said vessel and its contents to a temperature higher than the melting point of the resulting saponified material when anhydrous, and forcing steam into the inlet through the material while permitting steam and the resulting volatile products to escape through the outlet in order to exclude air while maintaining the contents of the vessel in a liquid, anhydrous condition.

6. The process of purifying soap made from oxygen-containing organic bodies derived from the oxidation of petroleum and characterized by a content of free or combined monocarboxylic groups which consists in placing said soap in a closed vessel, injecting steam into said vessel to remove air from contact with said soap, heating the vessel and its contents to a temperature at which said soap becomes molten and anhydrous even though in the presence of steam, and vigorously agitating said soap to prevent local overheating while continuing the injection of steam and the application of heat to the vessel, thereby effecting a removal of alcoholic hydroxyl from said oxygen containing organic bodies and effecting a separation of unsaponifiable, volatile impurities without deleteriously affecting the soap, substantially as described.

7. The process of saponifying oxygen-containing organic bodies derived from the oxidation of petroleum and characterized by a content of free or combined monocarboxylic groups, which consist in placing said oxygen-containing bodies in a closed vessel, mixing a base therewith for the formation of soap, injecting steam into said vessel to remove air from contact with the contents of said vessel, heating said vessel and its contents to a temperature at which the contents will be molten and anhydrous even though in the presence of steam, and vigorously agitating the contents of said vessel to prevent local overheating while continuing the injection of steam and the application of heat to the vessel, whereby alcoholic hydroxyl is removed from said oxygen-containing bodies, substantially as described.

8. The process of saponifying oxygen-containing organic bodies derived from the oxidation of petroleum and characterized by a content of free or combined monocarboxylic groups, which consists in placing said oxygen-containing bodies in a closed vessel, mixing alkaline media with said oxygen-containing bodies, injecting steam into said vessel to remove air from contact with the contents thereof, heating the vessel and its contents to a temperature in excess of 250 degrees C., so that said contents become molten and anhydrous even though in the presence of steam, and vigorously agitating said contents to prevent local overheating while continuing the injection of steam and the application of heat to the vessel whereby alcoholic hydroxyl is removed from said oxygen-containing bodies substantially as described.

9. The process of treating lactones derived from the oxidation of petroleum which consists in placing said lactones in a closed vessel, mixing alkaline material therewith for the saponification thereof, injecting steam into said vessel to remove air from contact with the contents thereof, heating said vessel and its contents to a temperature in excess of 250 degrees C., so that said contents are molten and anhydrous even though in the presence of steam, and vigorously agitating said contents to prevent local overheating while continuing the injection of steam and the application of heat to the vessel whereby said lactones become converted into soaps of hydroxy acids from which subsequently hydroxyl groups are removed.

10. The process of saponifying oxygen-containing organic bodies derived from the oxidation of petroleum and characterized by a content of free or combined monocarboxylic groups, which consists in placing said oxygen-containing bodies in a closed vessel, mixing a base therewith, injecting steam into said vessel to remove air from contact with the contents thereof, heating the vessel and its contents to a temperature in excess of 250 degrees C., and agitating the contents of said vessel to prevent local overheating while continuing the injection of steam and the application of heat to the vessel, whereby alcoholic hydroxyl is removed from said oxygen-containing bodies substantially as described.

11. The process of purifying soap made from oxygen-containing organic bodies derived from the oxidation of petroleum and characterized by a content of free or combined monocarboxylic groups which consists in placing said soap in a closed vessel, removing air from contact with the contents of said vessel, heating the contents of said vessel to a temperature at which the same are molten and anhydrous, contacting said contents with a substance in heated gaseous form selected from the class consisting of steam, toluol, xylol, and carbon dioxide, and agitating the contents of said vessel to prevent local overheating while maintaining the contents of said vessel out of contact with air and continuing the application of heat thereto, thereby effecting a removal of alcoholic hydroxyl from said oxygen-containing organic bodies and effecting a separation of unsaponifiable, volatile impurities without deleteriously affecting the soap substantially as described.

12. The process of saponifying oxygen-containing organic bodies derived from the oxidation of petroleum and characterized by a content of free or combined monocarboxylic groups, which consists in placing said oxygen-containing bodies in a closed vessel, mixing a base therewith to cause saponification thereof, removing air from contact with the contents of said vessel, heating the contents of said vessel to a temperature at which the same are molten and anhydrous, contacting said contents with a substance in heated gaseous form selected from the class consisting of steam, toluol, xylol, and carbon dioxide, and agitating the contents of said vessel to prevent local overheating while maintaining the contents of said vessel out of contact with air and continuing the application of heat thereto, whereby alcoholic hydroxyl is removed from said oxygen-containing bodies substantially as described.

13. The process of purifying soap made from oxygen-containing organic bodies derived from the oxidation of petroleum and characterized by a content of free or combined monocarboxylic groups which consists in placing said soap in a closed vessel, removing air from contact with the contents of said vessel, heating the contents of said vessel to a temperature in excess of 250 degrees C., contacting said contents with a substance in heated, gaseous form selected from the class consisting of steam, toluol, xylol, and carbon dioxide, and agitating the contents of said vessel to prevent local overheating while maintaining the contents of said vessel out of contact with air and continuing the application of heat to said vessel, thereby effecting a removal of alcoholic hydroxyl from said oxygen-containing organic bodies and effecting a separation of unsaponifiable, volatile impurities without deleteriously affecting the soap substantially as described.

14. The process of saponifying oxygen-containing organic bodies derived from the oxidation of petroleum and characterized by a content of free or combined monocarboxylic groups which consists in placing said oxygen-containing bodies in a closed vessel, mixing a base therewith to cause saponification thereof, removing air from contact with the contents of said vessel, heating the contents of said vessel to a temperature in excess of 250 degrees C., contacting said contents with a substance in heated gaseous form selected from the class consisting of steam, toluol, xylol, and carbon dioxide, and agitating the contents of said vessel to prevent local overheating while maintaining the contents of said vessel out of contact with air and continuing the application of heat to said vessel, whereby alcoholic hydroxyl is removed from said oxygen-containing bodies substantially as described.

MARTIN HILL ITTNER.